United States Patent [19]
Takayanagi

[11] Patent Number: 5,327,936
[45] Date of Patent: Jul. 12, 1994

[54] SPOOL VALVE WITH SELF-CENTERING MECHANISM

[75] Inventor: Hisao Takayanagi, Saitama, Japan

[73] Assignee: Kabushiki Kaisha Showa Seisakusho, Gyoda, Japan

[21] Appl. No.: 998,837

[22] Filed: Dec. 30, 1992

[30] Foreign Application Priority Data

Jan. 10, 1992 [JP] Japan .................. 4-004402[U]

[51] Int. Cl.⁵ .................. F16K 27/04; F15B 13/04; B62D 5/087
[52] U.S. Cl. .................. 137/625.69; 251/337
[58] Field of Search .................. 137/625.69; 251/337

[56] References Cited

U.S. PATENT DOCUMENTS 4,777,980 10/1988 Warhurst et al. .............. 137/625.69

FOREIGN PATENT DOCUMENTS 1530381 10/1978 United Kingdom .

Primary Examiner—Gerald A. Michalsky
Attorney, Agent, or Firm—Rosen, Dainow & Jacobs

[57] ABSTRACT

A spool valve includes a spool assembly axially movably disposed in a cylindrical valve case. The spool assembly comprises a guide sleeve threaded in an end portion of the valve case and having an inner end positioned in the valve case and an outer end positioned outside of the valve case, and a spool axially slidably extending through an opposite end portion of the valve case and the guide sleeve. The spool is centered with respect to the valve case by a self-centering mechanism which is retained in the guide sleeve and the spool by a stopper nut threaded in the inner end of the guide sleeve. A lock nut is threaded over the outer end of the guide sleeve for fastening the guide sleeve to the valve case.

6 Claims, 4 Drawing Sheets

SPOOL VALVE WITH SELF-CENTERING MECHANISM

BACKGROUND OF THE INVENTION

1. Field of the Invention

The present invention relates to a spool valve for use as a directional control valve in an actuator such as a power steering apparatus for use on a motor vehicle, a powered boat, or the like.

2. Description of the Prior Art

There are known spool valve assemblies for use as a directional control valve in an actuator such as a power steering apparatus for use on a motor vehicle, a powered boat, or the like.

One known spool valve is illustrated in FIG. 1 of the accompanying drawings. As shown in FIG. 1, the spool valve has a spool 101 axially movably disposed in a valve case 106. The spool 101 is axially guided by a guide sleeve 107 fitted over one end of the spool 101 and threaded in one end of the valve case 106. An annular groove 100 is defined jointly in an outer circumferential surface of the spool 101 and an inner circumferential surface of the guide sleeve 107. The annular groove 100 houses therein a pair of axially spaced spring seats 102, 103 that are axially slidable in the annular groove 100, and a centering spring 104 interposed between and acting on the spring seats 102, 103. The spring seats 102, 103 and the centering spring 104 serve as a neutral position holding mechanism, or a self-centering mechanism, for returning the spool 101 to a neutral position with respect to the valve case 106. The spool 101 is maintained in the neutral position by the neutral position holding mechanism when no external forces are applied to the spool 101. However, as the guide sleeve 107 is not positionally adjustable, the changeover timing or position of the spool 101, i.e., the timing or position for the spool 101 to switch from one position to another, suffers an error depending on the machining accuracy of the spool valve.

Another conventional spool valve is shown in FIG. 2 of the accompanying drawings. The spool valve shown in FIG. 2 is a modification of the spool valve shown in FIG. 1, i.e., has a spacer 108, Belleville springs 109, and a set screw 110 in addition to the components of the spool valve shown in FIG. 1. More specifically, the spacer 108, which is of an annular shape, is axially slidably fitted over the spool 101 and held axially against ends of the guide sleeve 107 and the spring seat 103. The Belleville springs 109 are disposed between the spacer 108 and an inner axial wall of the valve case 106. The guide sleeve 107 is fixed to the valve case 106 by the set screw 110. In the spool valve shown in FIG. 2, since the spool 101 is positionally adjustable by loosening and retightening the set screw 110, an error of the changeover timing of the spool 101 can be eliminated by adjusting the position of the spool 101. However, the guide sleeve 107 tends to be loosened and positionally displaced because it is always subject to forces from the Belleville springs 109. The conventional spool valve shown in FIG. 2 is disclosed in U.S. Pat. No. 4,777,980.

SUMMARY OF THE INVENTION

It is an object of the present invention to provide a spool valve which allows a spool to be easily brought into a neutral position with respect to a valve case and keeps the spool in the neutral position accurately without errors.

Another object of the present invention is to provide a spool valve which prevents a spool assembly from being displaced after the neutral position of a spool has been established.

According to the present invention, there is provided a spool valve comprising a valve case, a spool assembly axially movably disposed in the valve case, the spool assembly comprising a spool, a guide sleeve fitted over the spool and threaded in the valve case, and a mechanism retained jointly by the spool and the guide sleeve for holding the spool in a neutral position with respect to the guide case, and a lock nut threaded over the guide sleeve and pressed against an axial end of the valve case.

According to the present invention, there is also provided a spool valve comprising a cylindrical valve case, a guide sleeve threaded in the valve case, a spool axially slidably extending through the valve case and the guide sleeve, a self-centering mechanism retained in the guide sleeve and the spool for centering the spool with respect to the valve case, and a lock nut threaded over the guide sleeve for fastening the guide sleeve to the valve case.

According to the present invention, there is further provided a spool valve comprising a cylindrical valve case, a guide sleeve threaded in an end portion of the valve case and having an inner end positioned in the valve case and an outer end positioned outside of the valve case, a spool axially slidably extending through an opposite end portion of the valve case and the guide sleeve, self-centering means for centering the spool with respect to the valve case, a stopper nut threaded in the inner end of the guide sleeve and retaining the self-centering means jointly in the guide sleeve and the spool, and a lock nut threaded over the outer end of the guide sleeve for fastening the guide sleeve to the valve case.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 3:
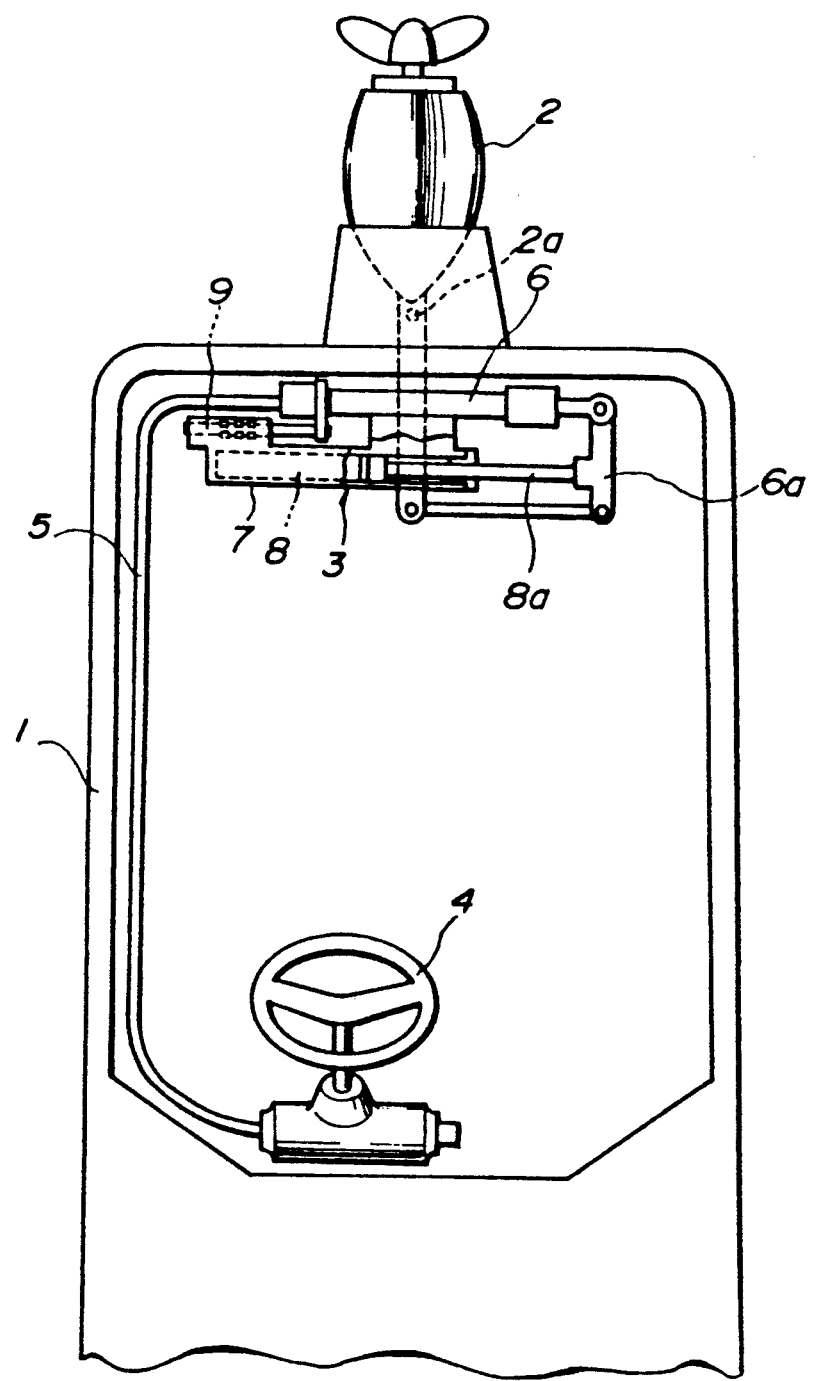
FIG. 3 is a fragmentary plan view of a boat with a power steering apparatus having a spool valve according to the present invention.

The principles of the present invention are particularly advantageous when embodied in a spool valve for use as a directional control valve in an actuator such as a power steering apparatus for use on a motorboat as shown in FIG. 3. However, it should be understood that the spool valve according to the present invention can be used as a directional control valve in any of various other actuators on motor vehicles or the like.

As shown in FIG. 3, a motorboat has an outboard engine 2 mounted on and positioned outside the stern of a motorboat hull 1. The outboard engine 2 is supported on a vertical shaft 2a for angular movement in a horizontal plane. The motorboat also has a power steering apparatus 3 mounted on and positioned in the stern for steering the outboard engine 2. The power steering apparatus 3 is operatively connected to a steering wheel 4 through a steering cable 5 extending along a side of the motorboat hull and a steering shaft 6 parallel to the stern of the motorboat.

The power steering apparatus 3 comprises a block 7, a hydraulic cylinder unit 8 disposed in the block 7 parallel to the steering shaft 6, and a spool valve 9 disposed as a directional control valve in the block 7 parallel to the hydraulic cylinder unit 8 for controlling the supply of a working fluid to the hydraulic cylinder unit 8. The steering shaft 6 is coupled through a clevis 6a to a piston rod 8a of the hydraulic cylinder unit 8 remotely from the spool valve 9.

When the steering wheel 4 is turned in one direction or the other, the steering shaft 6 is axially moved to turn the outboard engine 2 about the vertical shaft 2a. At this time, the spool valve 9 is switched over to supply the working fluid to either a rod-end chamber or a blind-end chamber of the hydraulic cylinder unit 8, which then pushes or pulls the piston rod 8a to assist in turning the outboard engine 2.

Figure 4:
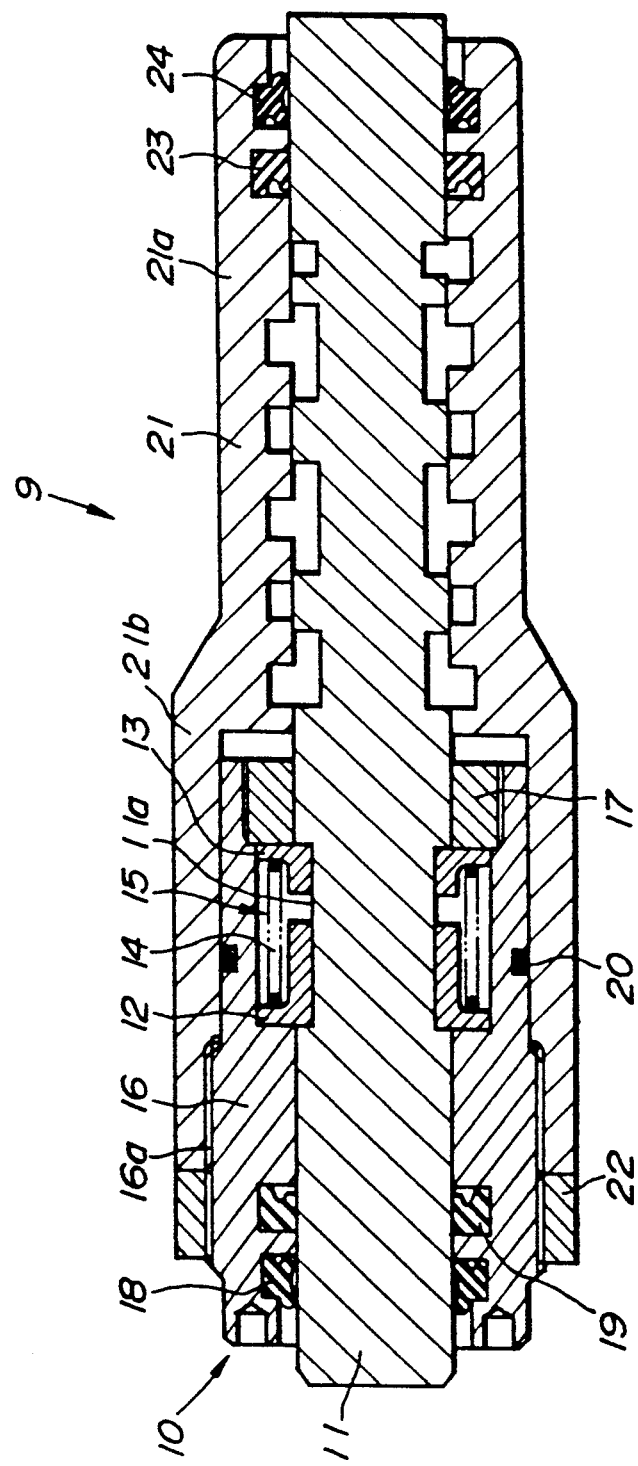
FIG. 4 is an enlarged axial cross-sectional view of the spool valve shown in FIG. 3.

As shown in FIG. 4, the spool valve 9 comprises a spool assembly or spool unit 10 axially slidably disposed in a cylindrical valve case 21. The spool assembly 10 generally comprises a spool 11 axially slidably disposed in a smaller-diameter portion 21a of the valve case 21, and a guide sleeve 16 relatively movably fitted over an end portion of the spool 11. The guide sleeve 16 has an externally threaded surface 16a threaded in an internally threaded end of a larger-diameter portion 21b of the valve case 21. An annular groove 11a is defined jointly in an outer circumferential surface of the spool 11 and an inner circumferential surface of the guide sleeve 16. The annular groove 11a houses therein a pair of axially spaced spring seats 12, 13 that are axially slidable in the annular groove 11a, and a centering spring 14 interposed between and acting on the spring seats 12, 13. The spring seats 12, 13 and the centering spring 14 serve as a neutral position holding mechanism, or a self-centering mechanism, 15 for returning the spool 11 to a neutral position with respect to the valve case 21. An annular stopper nut 17, which is fitted over the spool 11, is threaded in an inner end of the guide sleeve 16 and held against an end of the spring seat 13. The neutral position holding mechanism 15 is therefore held jointly in the spool 11 and the guide sleeve 16 by the stopper nut 17.

Oil seals 18, 19 are retained in an inner circumferential surface of the guide sleeve 16 near its outer end and slidably fitted over the spool 11. An 0-ring 20 is retained in an outer circumferential surface of the guide sleeve 16 radially outwardly of the central position holding mechanism and slidably held against an inner circumferential surface of the larger-diameter portion 21b of the valve case 21. Oil seals 23, 24 are retained in an inner circumferential surface of smaller-diameter portion 21a of the valve case 21 near its outer end and slidably fitted over the spool 11.

Figure 5:
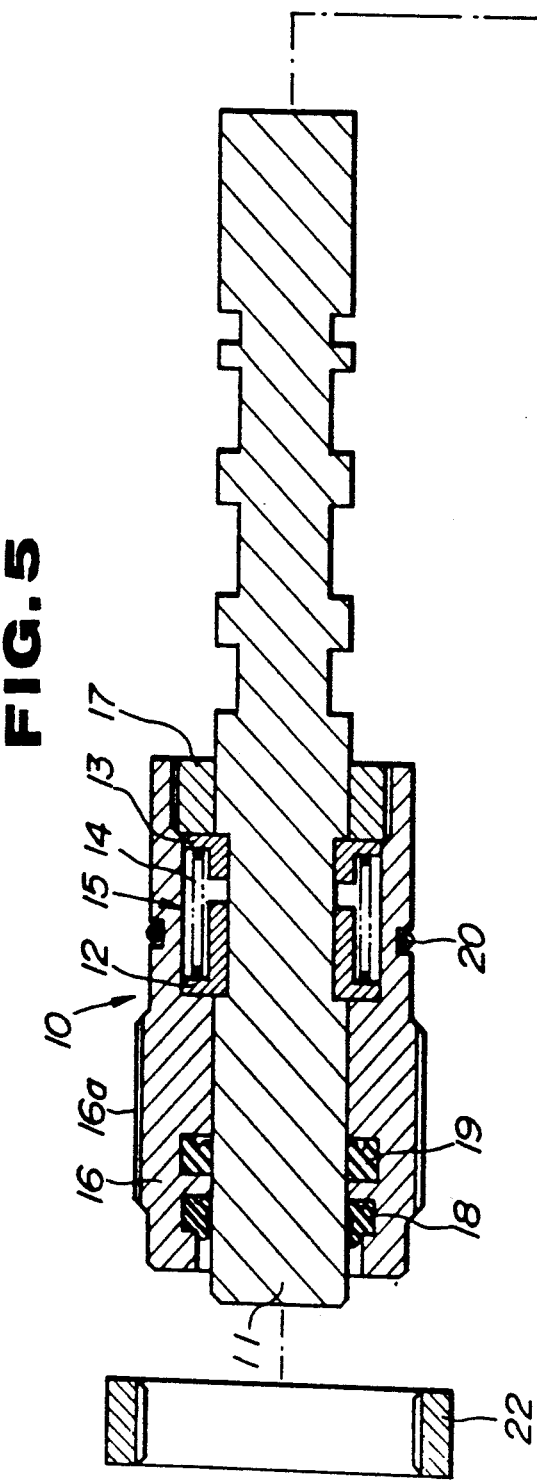
FIG. 5 is an exploded axial cross-sectional view of the spool valve shown in FIG. 4.
Figure 5:
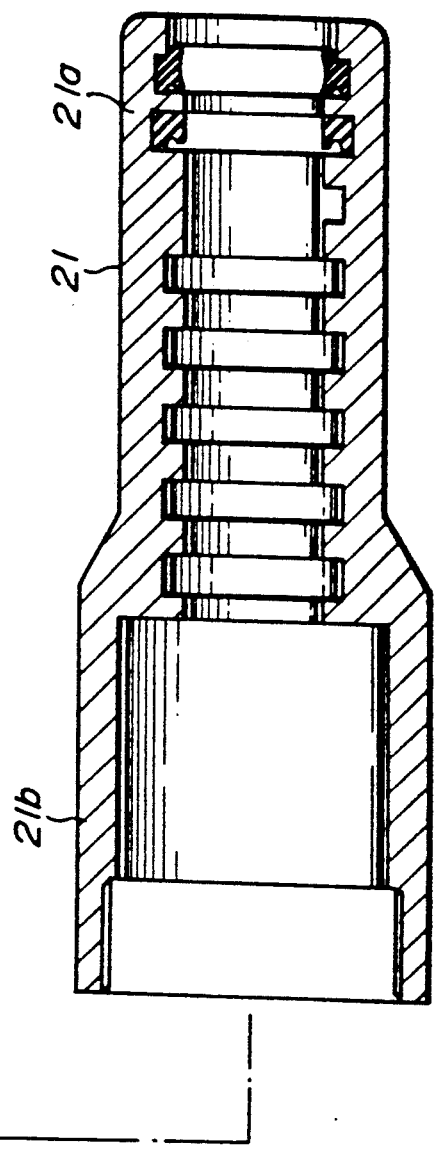

To assemble the spool valve 9, the spool assembly 10 is inserted axially into the valve case 21 by threading the guide sleeve 16 into the larger-diameter portion 21b of the valve case 21, as shown in FIG. 5. While the spool assembly 10 is being axially moved back and forth, the spool 11 is brought into its neutral position and maintained in the neutral position by the neutral position holding mechanism 15. After the spool 11 has been adjusted to the neutral position, the guide sleeve 16 is securely anchored to the larger-diameter portion 21b of the valve case 21 by a lock nut 22 which is threaded over the externally threaded surface 16a of the guide sleeve 16 at its outer end outside of the larger-diameter portion 21b of the valve case 21. The lock nut 22 is threaded over the externally threaded surface 16a until it is pressed against an axial end of the larger-diameter portion 21b of the valve case 21.

Since the spool assembly 11 with the neutral position holding mechanism 15 retained by the stopper nut 17 is inserted and threaded as a unit in the valve case 21, the changeover timing or position of the spool 11 can easily be adjusted accurately without errors. After the changeover timing or position of the spool 11 has been adjusted, the guide sleeve 16 is firmly secured to the valve case 21 by the lock nut 22 so that the guide sleeve 16 will not be loosened. In addition, inasmuch as no forces are applied in an axial direction to push the guide sleeve 16 with respect to the valve case 21, the guide sleeve 16 is reliably prevented from being loosened.

Figure 1:
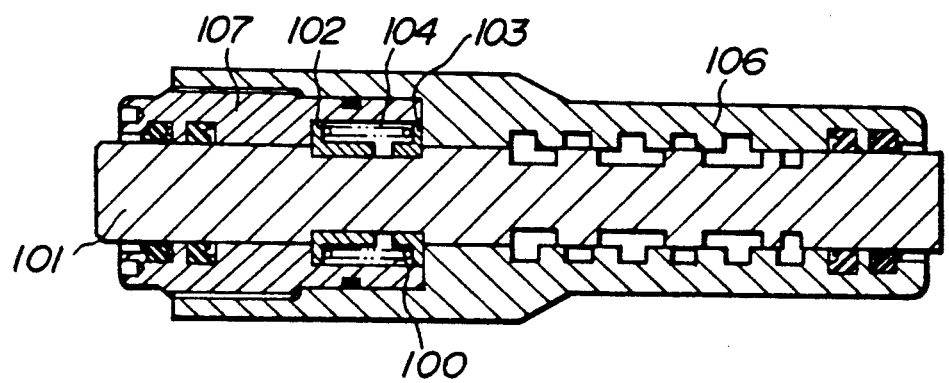
FIG. 1 is an axial cross-sectional view of a conventional spool valve.
Figure 2:
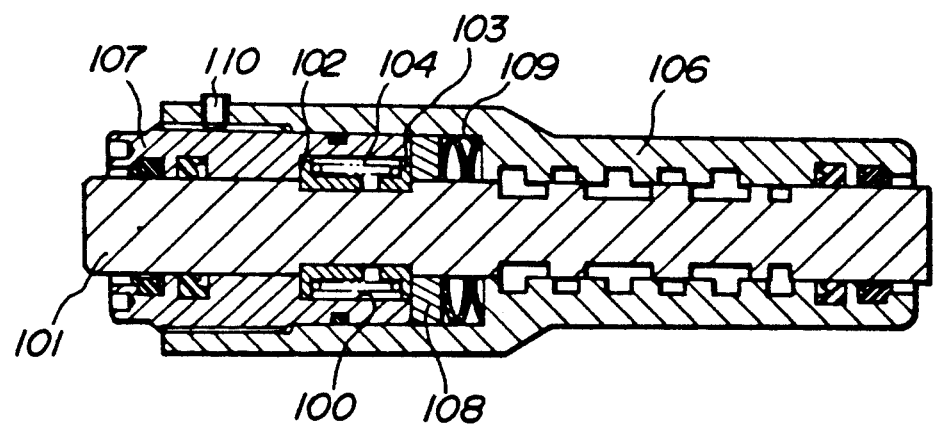
FIG. 2 is an axial cross-sectional view of another conventional spool valve.

As the neutral position holding mechanism 15 is retained in position only by the stopper nut 17, the entire spool valve 9 is made up of a smaller number of parts than the conventional spool valve which includes a spacer and Belleville springs as shown in FIG. 2.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A spool valve comprising:
   a valve case;
   a spool assembly axially movably disposed in said valve case, said spool assembly comprising a spool, a guide sleeve fitted over said spool and threaded in said valve case, and a mechanism retained jointly by said spool and said guide sleeve for holding said spool in a neutral position with respect to said valve case;
   a lock nut threaded over said guide sleeve and pressed against an axial end of said valve case, and stopper means threadedly fastened to said guide sleeve for axially retaining said mechanism in said spool and said guide sleeve.

2. A spool valve according to claim 1, wherein said stopper means comprises a nut threaded in said guide sleeve and fitted over said spool.

3. A spool valve comprising:
   a cylindrical valve case;
   a guide sleeve threaded in said valve case;
   a spool axially slidably extending through said valve case and said guide sleeve;
   a self-centering mechanism retained in said guide sleeve and said spool for centering said spool with respect to said valve;
   a lock nut threaded over said guide sleeve for fastening said guide sleeve to said valve case; and a stopper nut threaded in said guide sleeve for axially retaining said self-centering mechanism in said spool and said guide sleeve.

4. A spool valve comprising:
a cylindrical valve case;
a guide sleeve threaded in an end portion of said valve case and having an inner end positioned in said valve case and an outer end positioned outside of said valve case;
a spool axially slidably extending through an opposite end portion of said valve case and said guide sleeve;
self-centering means for centering said spool with respect to said valve case;
a stopper nut threaded mn said inner end of the guide sleeve and retaining said self-centering means jointly in said guide sleeve and said spool; and
a lock nut threaded over said outer end of the guide sleeve for fastening said guide sleeve to said valve case.

5. A spool valve according to claim 4, wherein said spool and said guide sleeve have an annular groove defined in outer and inner circumferential surfaces, respectively, said self-centering means comprising a pair of axially spaced spring seats disposed in said annular groove and a spring positioned between and acting on said spring seats.

6. A spool valve comprising a valve case having first and second axially spaced parts and a continuous cylindrical bore extending through said parts and internal threads in the bore within said second part,
a spool assembly axially movably disposed in said valve case, said spool assembly comprising a cylindrical spool having first and second parts respectively in said first and second parts of the valve case,
a cylindrical guide sleeve within the second part of the case and fitted over the second part of said spool, said guide sleeve having external threads at one end for engaging internal threads in the bore of said second part of the case,
a mechanism retained jointly by said spool and said guide sleeve for holding said spool in a neutral position with respect to said valve case, and
a lock nut threaded onto said external threads on said guide sleeve and urged against the axial end of said second part of said valve case, wherein said guide sleeve has internal threads terminating in an annular shoulder at the end opposite the end having external threads, said spool valve further comprising stopper means formed as an externally threaded sleeve which closely surrounds the spool and threadedly engages said internal threads of said guide sleeve and locks axially against said annular shoulder of said guide sleeve for axially retaining said mechanism in said spool and said guide sleeve.

* * * * *